C. S. LOCKWOOD.
WEARING PIECE FOR ENDS OF SPIRALLY WOUND ROLLS.
APPLICATION FILED DEC. 2, 1909.
964,287.
Patented July 12, 1910.
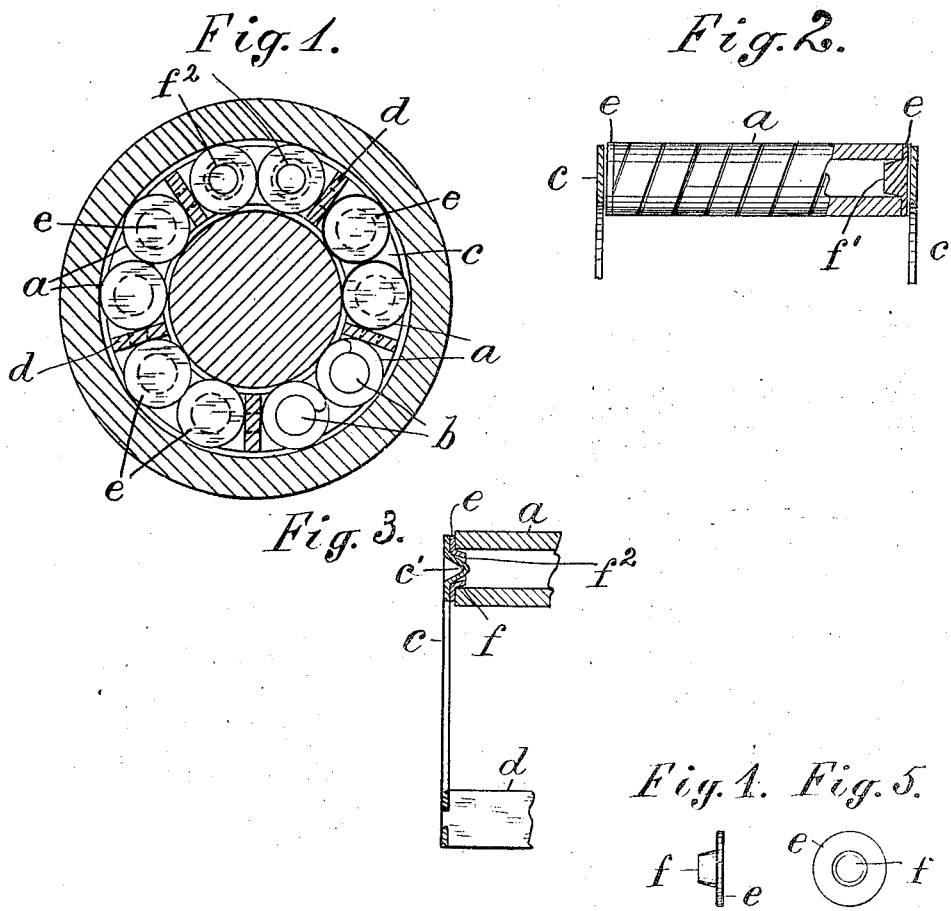
Witnesses
L. Lee.
J. Walter Greenbaum.
Inventor
Charles S. Lockwood, Jr.
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

WEARING-PIECE FOR ENDS OF SPIRALLY-WOUND ROLLS.

964,287.  Specification of Letters Patent.  Patented July 12, 1910.

Application filed December 2, 1909. Serial No. 530,938.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Wearing-Pieces for Ends of Spirally-Wound Rolls, fully described and represented in the following specification and the accompanying drawings, forming a part of the same.

This invention relates to that class of roller bearings in which spirally wound rolls are used and are guided within the bearing by a cage having heads movable with the roll at opposite ends of the rolls. Such rolls are hollow, and in order to retain them in the cage the heads of the cage have been made with hollow studs stamped upon one side of the heads to engage the adjacent ends of the rolls. The low grade steel from which the studs can be readily stamped is not adapted for hardening, but such unhardened heads are not adapted to wear well with the hardened steel rolls which are now required in high-duty bearings. The difference in hardness between such rolls and the heads of the cage results in serious wear of the said heads, due partly to any roughness of the ends, and which may arise from the chisel-shape of the coils at the ends of the rolls, if one of such ends should by accident be bent outwardly.

To prevent injurious wear, buttons have heretofore been inserted between the ends of solid rolls and the heads of the cage, but such loose buttons require a cage with concave bars as numerous as the rolls, forming sockets at their ends to retain the buttons in their operative position.

In the present invention, I avoid the expense of constructing the cage with concave bars by engaging the button positively with either the roll or the head by a suitable projection, such button in my invention being made of the same temper as the part to which it is opposed and upon which it rubs.

Such wearing-piece may be formed of a disk or button with a hub or boss fitted within the end of the bearing-roll and made of the same temper or hardness as the head of the casing, so that when the roll revolves in contact therewith it does not produce any appreciable wear; or it may be made as a disk secured upon the head of the cage opposite the end of the revolving roll and hardened to the same temper as the roll, so as to support the friction without material wear. It may also be made with a hollow hub adapted to fit snugly within the end of the spirally wound roll, and the bore of the hub adapted to fit loosely upon a stud formed on the head, the stud thus guiding the roll while the button prevents the roll from contacting with the head.

The invention will be understood by reference to the annexed drawing, in which—

Figure 1 is a cross section of a bearing with the rolls therein and the nearer end of the cage removed; Fig. 2 is a longitudinal section of the upper part of the cage with one of the rolls partly in section; Fig. 3 is a section of a roll and a head with a pressed stud; Fig. 4 is an edge view and Fig. 5 an end view of a button with hub to fit inside the end of the roll.

The rolls $a$ are formed of spiral coils having a bore $b$. In Figs. 2 and 3, part of the heads $c$ of a cage are shown with a roll $a$ fitted between the same and provided at the ends with buttons $e$ each having a hub $f'$ fitted within the bore of the roll. Fig. 3 shows part of a roll $a$ in section, with one of the heads $c$ of a cage and part of a tie-bar $d$. A conical stud $c'$ is shown pressed upon the head to retain one of the rolls in place. The wearing-disk or button $e$ which is inserted between the head and the end of the roll $a$, is formed with a hub $f$ to fit snugly within the bore of the roll, the hub having a socket $f^2$ to fit loosely upon the stud $c'$. Such a disk with hollow hub is readily stamped from malleable steel of the same hardness as the head $c$, so that when it rotates against the head about the stud it does not unduly abrade the head.

The button $e$ shown in Figs. 4 and 5 is represented with the hub $f$ but represents equally the solid hub $f'$ shown upon the button in Fig. 2. When such a button becomes worn, the hub $f$ or $f'$ can be readily removed from the roll to replace the worn wearing button with another one. The buttons are made or left of the same hardness as the head so as to avoid injurious wear of the head.

In Fig. 1, a part of the rolls are shown provided upon their nearer ends with the buttons $e$ having solid hubs, and a part with those having hollow hubs $f^2$, the ends of two rolls being left uncovered merely to show the bore $b$ of the rolls.

It is obvious that the buttons whatever their form may be made of the same hardness as the head or of the roll, as may be required, thus avoiding the wear which is caused by a hardened roll revolving in contact with a softer head. The untempered heads of the cage and the hardened ends of the rolls form opposed members between which the buttons are inserted, and engaged with one of such members, being tempered correspondingly to the opposed member so as to avoid wear therewith.

It is obvious that any friction which causes wear is very objectionable, because it consumes power in the operation of the roller bearing, and also loosens fine particles of metal, which by their presence within the bearing cause abrasion and wear of the rolling surfaces.

The cage used in guiding the rolls is particularly useful in holding the rolls in a unitary structure apart from the roller bearing, if the rolls be engaged with the heads so that it may be handled and transported with facility, and it is found that in such cases it is undesirable to harden the heads of the cages, because it renders them more brittle and liable to breakage by accident, and because the hardening necessarily distorts the head in some degree. Such heads are often made detachable from the tie-bars and are sometimes formed of bronze and other metals than steel, but it is understood that if the heads are formed of steel and secured to the tie-bars by tenons riveted in mortises in the heads (see Fig. 3) it would be very undesirable to harden the heads as they would be liable to crack when hammering the tenons to rivet them in the mortises.

The essential part of my invention is the application of an attached supplemental wearing-piece between the flat ends of a tubular spirally wound roll and the head of the cage, and tempered like the opposed part, the construction being preferably such as to retain the rolls in the cage when removed from the bearing, so as to form a self-contained structure.

Having thus set forth the nature of the invention what is claimed herein is:

1. In a roller bearing, the combination, with a cage having heads of untempered steel, of spirally wound tubular hardened rolls fitted to revolve between the heads, buttons held between the ends of the rolls and the heads of the cage and having each a hub or shank engaged with the bore of the roll and made of the same temper as the head.

2. In a roller bearing, the combination, with a cage having heads, of tubular spirally wound rolls fitted to revolve between the heads, and buttons secured upon the ends of such rolls to contact with the heads and prevent the wear of the heads by the end of the spiral strand in the roll.

3. In a roller bearing, the combination, with a cage having heads of untempered steel provided with integral studs to retain the rolls in place, of spirally wound tubular hardened rolls fitted to revolve between the heads, and buttons of untempered steel having hollow hubs fitted snugly to the bores of the rolls to turn therewith, and the hollows of the hubs fitted loosely to the studs on the heads to revolve thereon.

In testimony whereof I have hereunto set my hand in the presence of two subscribing witnesses.

CHARLES S. LOCKWOOD.

Witnesses:
    ALFRED P. SLOAN, Jr.
    H. E. SAUL.